UNITED STATES PATENT OFFICE.

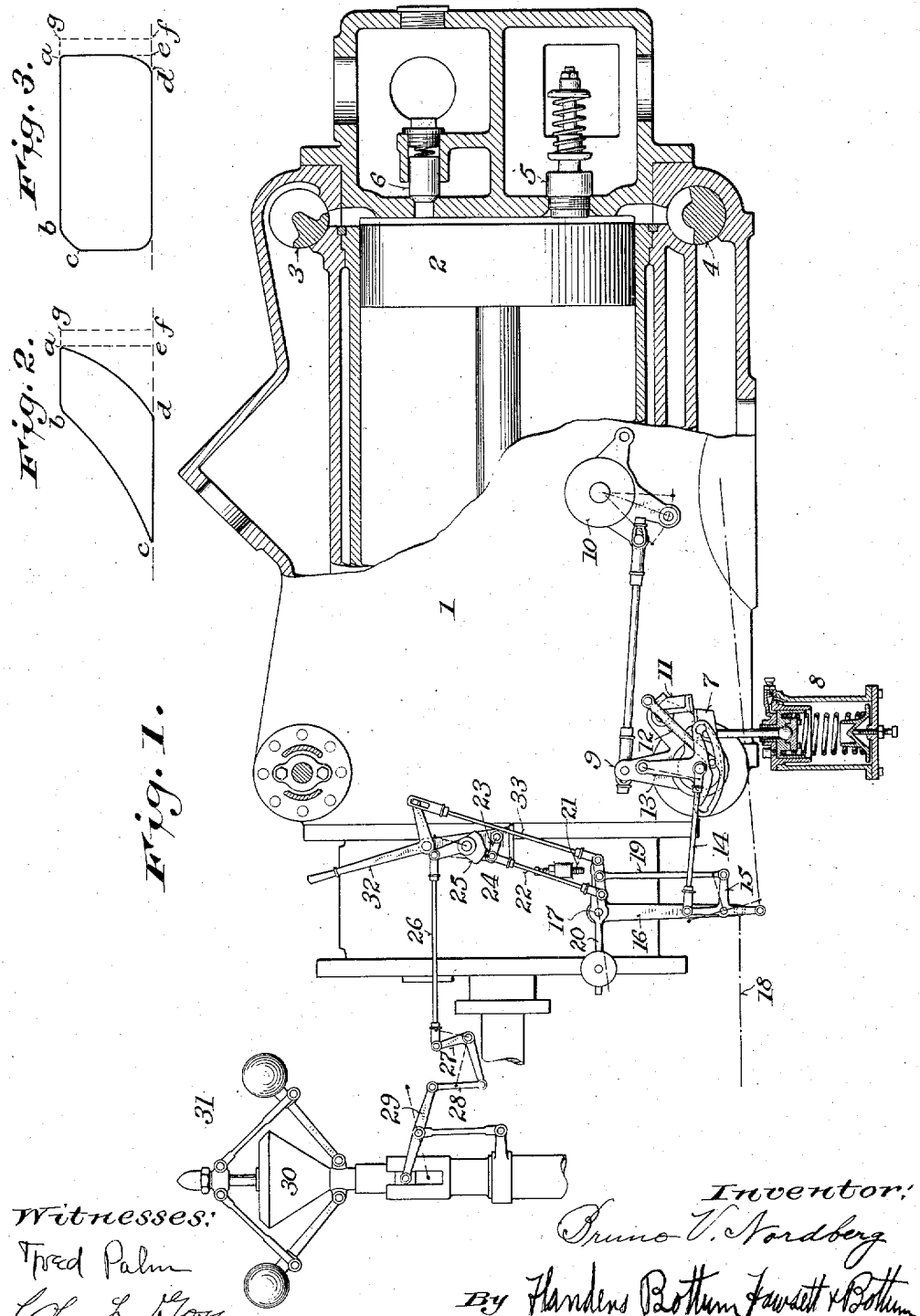

BRUNO V. NORDBERG, OF MILWAUKEE, WISCONSIN.

COMPRESSION-CONTROLLING MECHANISM FOR ENGINES.

1,157,030.  Specification of Letters Patent.  Patented Oct. 19, 1915.

Application filed January 28, 1914. Serial No. 814,884.

*To all whom it may concern:*

Be it known that I, BRUNO V. NORDBERG, a citizen of the United States, residing at Milwaukee, in the county of Milwaukee and State of Wisconsin, have invented certain new and useful Improvements in Compression-Controlling Mechanism for Engines, of which the following is a specification, reference being had to the accompanying drawing, forming a part thereof.

This invention relates more particularly to engines, such as steam and compressed air hoisting engines, which have to be frequently started and stopped and are run at different speeds. Its main objects are to provide for compression of the working fluid in the cylinder when the engine is running at full or high speed in order to check the momentum of the reciprocating parts of the engine and secure economy in its operation; and to provide for eliminating compression when the engine runs at slow or below normal speed in order to give the engineer more perfect control of its operation and to stop and start with precision, certainty and ease at any point in the stroke of the piston.

The invention consists in the peculiarities of construction, arrangement and combination of parts as hereinafter particularly described and pointed out in the claims.

In the accompanying drawing Figure 1 is a partial side elevation and partial vertical axial section of a portion of an engine embodying the invention; and Figs. 2 and 3 are diagrams illustrating the operation of the engine.

The compression controlling mechanism constituting the present invention is specially adapted to compressed air hoisting engines of the type shown and described in United States Letters Patent No. 926,819, issued to me July 6, 1909, which are convertible from motors to compressors and vice versa by shifting the valves, but it is applicable to other engines which are run at different speeds and have to be operated with precision.

Referring to Fig. 1 of the drawing, 1 designates the engine cylinder and 2 the piston, which is shown at the limit of its movement to the right. The cylinder is provided at the ends with rotative inlet or admission valves 3 and rotative exhaust valves 4, and with automatic or self-acting suction valves 5 and discharge valves 6.

The inlet or admission valves, one of which is shown at the right in Fig. 1, may be operated by full stroke releasing gear of the Corliss type, such as is shown and described in the above mentioned United States Letters Patent and in Letters Patent No. 680,667, issued to me August 13, 1901, but as such gear does not relate directly to the present invention and is unnecessary to a full comprehension thereof, it is not shown and specifically described.

The engine is provided with valve gear for operating the exhaust valves 4, similar to that shown and described in the Letters Patent above mentioned, as shown at the left in Fig. 1. This valve gear, which is duplicated at the ends of the cylinder, comprises an arm 7, which is connected by a rod with the plunger of a dash pot 8, which has a constant tendency to close the valve, the upward movement by the plunger effected by a spring, closing the valve.

A rocking valve opening lever 9, loosely fulcrumed or pivoted on the valve bonnet concentrically with the valve stem or with the pivot axis of the arm 7, is connected by a rod with a wrist plate 10, which is actuated by an eccentric (not shown) on the crank shaft or other synchronously rotating part of the engine. A latch 11, pivoted to an arm of the lever 9, and provided with a trip steel or block, is adapted when turned into operative position, to engage with a trip steel or block on the arm 7 and to open the valve 4 during or at the end of the return or compression stroke of the piston. The latch 11 is provided at an angle thereto with a trip arm 12, having a roller or pin at its free end working in a slot in a trip cam 13, which is pivoted to the lever 9. The slot in this cam is formed in two arcs concentric with the pivot of the cam, and of longer and shorter radii, the two arcs being connected by an offset at or near the center of the cam, which determines the point of release and cut off. When the roller or pin on the trip arm 12 traverses that part of the slot which is of the shorter radius, the latch 11 is held in operative position for opening the valve, and when the roller or pin traverses that part of the slot which is of the longer radius, the latch is held out of operative position and the valve remains closed.

The cam 13 is connected by a rod 14 with a tripple or T-lever 15, which is mounted on a rocking carrier arm 16, pivoted on a fixed stud 17. The arm 16 is connected by a rod 18 with an eccentric (not shown) on the crank shaft or other synchronously rotating part of the engine, from which it receives its rocking movement. The middle arm of the lever 15 is connected by a rod 19 with a weighted lever 20, which is loosely fulcrumed on the stud 17. The weight on the lever 20 operates when free to act, through the lever 15, to shift the trip cams 13 into position of later release or cut off, the movement of the lever 20 by the weight being limited by an adjustable stop 21, which is set to release and permit the valves 4 to close at or near the limits of the return or exhaust strokes of the piston, the valves remaining closed during the entire working strokes of the piston when the engine operates as a motor.

The lever 20 is connected by a rod 22 with a rocker arm 23, which is provided with a roller 24 in the path of a cam 25. The cam 25 is connected by rods and levers 26, 27, 28 and 29, with the counterpoise 30 of a centrifugal governor 31, which is connected with and actuated by the engine, in the usual or any suitable manner. The construction of the cam 25 and the adjustment of its connections with the governor are such that when the engine attains a certain velocity, the trip cams 13 will be shifted into position to release and permit the valves 4 to close at a distance from the ends of the return or exhaust strokes of the piston, preferably at such points that the working fluid confined in the cylinder will be compressed to its initial pressure, so that when the engine runs at high or normal speed, it will produce an indicator card like or similar to that shown by Fig. 2, according to which the working fluid is admitted to the cylinder from $a$ to $b$, and expands from $b$ to $c$. At $c$ the movement of the piston is reversed and the exhaust valve 4 is opened, remaining open to the point $d$, at which the trip cam 13 under control of the governor, releases and permits the exhaust valve to close. From the point $d$ the working fluid is compressed, as represented by the curved line $d$—$a$, to its initial pressure at the end of the return or exhaust stroke of the piston, when the admission or inlet valve is again opened. Under these conditions, not only is the momentum of the rapidly reciprocating parts of the engine checked, and damage to the engine prevented, but also economy of power is effected by the compression of the working fluid to its initial pressure in the clearance space represented by the line $f$—$g$, in Figs. 2 and 3, at the end of the return or exhaust stroke of the piston, since the power represented by the area $a$—$e$—$f$—$g$ would otherwise be wasted, it being necessary to first fill the clearance space with the working fluid at initial pressure at the beginning of each working stroke of the piston when this space is exhausted at the end of the return stroke.

The compression controlling mechanism is shown by full lines in Fig. 1 in the condition it assumes when the engine is running at high speed and the counterpoise 30 of the governor is lifted, and the indicator card or diagram shown by Fig. 2 illustrates the distribution of the working fluid in the cylinder under these conditions.

When the engine runs at low speed and the counterpoise of the governor descends, the compression controlling mechanism assumes the condition indicated by dotted lines in Fig. 1, the high part of the cam 25 being moved away from the roller 24 and permitting the lever 20 to be turned by its weight against the stop 21. Under these conditions the latches 11 will be held in engagement with the arm 7, and the exhaust valves 4 will be held open to, or nearly to the ends of the return or exhaust strokes of the piston.

The distribution of the working fluid in the cylinder and the operation of the engine running at low speed, are illustrated by the indicator card or diagram shown by Fig. 3, according to which the working fluid is admitted to the cylinder from $a$ to $b$, the admission or inlet valve closing at the point $b$, and expansion taking place from $b$ to the point $c$, at the end of the working stroke of the piston. The exhaust valve opens at $c$, and is held open to or nearly to the end of the return stroke of the piston, closing at $d$ with little or no compression. Under these conditions the engine can be run very slowly, stopped and started when the piston is in any position, and manipulated or maneuvered with ease and precision, but the power represented by the area $a$—$e$—$f$—$g$, of the working fluid in the clearance space is lost, since this space, which is exhausted at the end of each return stroke of the piston, must be filled with fluid to initial pressure at the beginning of every working stroke of the piston.

A lever 32 connected by a rod 33 or otherwise, with the weighted lever 20, is provided for shifting the compression controlling mechanism independently of the governor when the engine operates as a compressor, according to Letters Patent No. 926,819.

Various modifications in the construction, arrangement and combination of parts may be made without departing from the principle and scope of the invention as defined in the following claims.

I claim:

1. In an engine the combination of an exhaust valve, valve operating mechanism comprising closing means, opening means and releasing means, and a governor connected with the releasing means and adapted when the engine attains a certain speed to release and permit the valve to close before the piston reaches the end of its exhaust stroke and when the engine runs below that speed, to hold the valve open approximately to the end of the exhaust stroke of the piston.

2. In an engine the combination of an exhaust valve, valve operating mechanism comprising means tending to close the valve, opening means and releasing means, and a governor connected with the releasing means and adapted when the engine attains a certain speed to release and permit the valve to close at such a point in the exhaust stroke of the piston that the working fluid confined in the cylinder will be compressed to its initial pressure at the end of such stroke and when the engine runs below that speed, to hold the valve open approximately to the end of the exhaust stroke of the piston.

3. In an engine the combination of a cylinder provided adjacent to its ends with exhaust valves, valve operating mechanism comprising means tending to close the valves, opening means and releasing means, a weighted lever connected with said releasing means and tending when free to delay the closing of said valves, and a governor connected with said lever and adapted when the engine attains a certain speed to shift said releasing means into position to permit the valves to close before the piston reaches the end of its exhaust strokes and when the engine runs below that speed, to shift said releasing means into position to hold the valves open approximately to the end of the exhaust strokes of the piston.

4. In an engine the combination of a cylinder provided adjacent to its ends with exhaust valves, valve operating mechanism comprising means tending to close the valves, opening means and releasing means, a weighted lever connected with said releasing means and tending when free to delay the closing of the valves, a stop for limiting the movement of said lever in the direction of delayed release and arranged to release and permit the valves to close near the end of the exhaust strokes of the piston, and a governor connected with said lever and adapted when the engine attains a certain speed to shift said releasing means into position to release and permit the valves to close at such points in the exhaust strokes of the piston that the working fluid will be compressed approximately to its initial pressure at the ends of such strokes.

5. In an engine the combination of a cylinder having exhaust valves at the ends, valve operating mechanism comprising closing means, opening means and releasing means, a weighted lever connected with and tending to shift said releasing means into position to release and permit the valves to close at the end of the exhaust stroke of the piston, a cam adapted to shift said lever in the opposite direction and a governor connected with said cam and adapted when the engine attains a certain speed to shift said cam, lever and releasing means into position to release and permit the valves to close before the piston reaches the ends of its exhaust strokes.

6. In an engine the combination of a cylinder having exhaust valves at the ends, valve operating mechanism comprising closing means, opening means and releasing means adapted to release and permit the valves to close at different points in the stroke of the piston, a weighted lever connected with and tending to shift said releasing means into position for later release, a stop for limiting the movement of said lever in that direction, a rocker arm connected with said lever for shifting it in the opposite direction, a cam arranged to coöperate with said arm and a governor connected with said cam and adapted when the engine attains a certain speed to turn said arm and weighted lever into position for earlier release of said valves on the exhaust strokes of the piston.

7. In an engine the combination of a cylinder having exhaust valves at the ends, valve operating mechanism comprising means constantly tending to close the valves, closing means and releasing means, a governor connected with said releasing means and adapted when the engine attains a certain speed to release and permit the valves to close before the piston reaches the ends of its exhaust strokes and when the engine runs below that speed to hold the valves closed approximately to the ends of the exhaust strokes of the piston, and means for manually shifting said releasing means independently of the governor.

8. In an engine the combination of a cylinder having exhaust valves, rocker arms connected with the valves, means connected with said arms and tending to close the valves, rocking levers having fulcrums concentric with the pivots of said arms, latches pivoted to said levers and adapted by engagement with said arms to open the valves, trip cams pivoted to said levers and engaging said latches, a rocking carrier arm, a T-lever mounted on said carrier arm and connected with said cams, a cam adjusting lever fulcrumed concentrically with the pivot of said carrier arm and connected with the middle arm of said T-lever, a governor actuated by the engine, a cam connected with the governor and adapted to shift the cam adjusting lever into position to release said valves before the ends of the exhaust strokes of the piston when the engine attains a certain speed, and a weight connected with said cam adjusting lever and adapted to shift it into position to release said valves at the ends of the exhaust strokes of the piston.

In witness whereof I hereto affix my signature in presence of two witnesses.

BRUNO V. NORDBERG.

Witnesses:
 CHARLES L. GOSS,
 E. C. BAYERLEIN.

Copies of this patent may be obtained for five cents each, by addressing the "Commissioner of Patents, Washington, D. C."